Feb. 11, 1958 W. ASCHERMANN 2,823,305
NON-RADIATING FREQUENCY CONVERTER FOR A RADIO RECEIVER
Filed Feb. 20, 1956
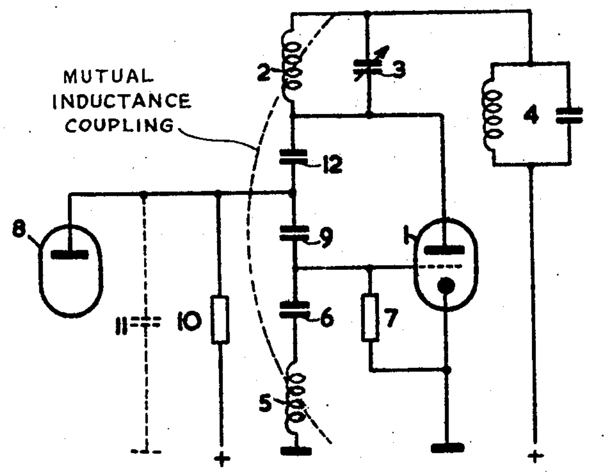
INVENTOR
WILFRIED ASCHERMANN
BY [signature]
AGENT 2,823,305
Patented Feb. 11, 1958

2,823,305

NON-RADIATING FREQUENCY CONVERTER FOR A RADIO RECEIVER

Wilfried Aschermann, Hamburg-Harburg, Germany, assignor, by mesne assignments, to North American Philips Company, Inc., New York, N. Y., a corporation of Delaware Application February 20, 1956, Serial No. 566,440

Claims priority, application Germany March 10, 1955

5 Claims. (Cl. 250—20)

This invention relates to frequency converters for use in radio receivers, and more particularly to frequency converters of the additive mixer type.

It is known that with an additive mixing circuit arrangement comprising an electron tube, more particularly a triode, the oscillations from the oscillator occur with a high amplitude across the grid circuit, so that they may be radiated via the aerial connected to the grid, which may give rise to interference in other receivers. By using a preamplifier tube these disadvantages may be avoided, but even in this case an inadmissibly strong radiation may occur, since the anode-grid capacity of the preamplifier tube, particularly at high frequencies, constitutes only a resistance for the oscillations from the oscillator, which cannot be regarded as an infinitely high resistance. The tuning of the aerial or of a preliminary circuit may have a disturbing effect on the oscillator amplitude, or as the case may be, on the oscillator frequency, when the oscillations from the oscillator are fed to these high frequency circuits. Especially on account of the production of harmonic resonances it may occur that the oscillations from the oscillator fail completely in part of the tuning range.

It is therefore necessary to feed the high-frequency oscillations (signal oscillations), or to connect the input high-frequency circuit or a preamplifier stage, in the case of an additive mixing arrangement, at a point where no oscillations from the oscillator occur. To this end a bridge circuit of the known Tropadyne arrangement may be included in the grid circuit, in which the high-frequency oscillations are fed to the tapping of the inductor or to a capacitative point of symmetry.

However, it is difficult to provide, with adequate accuracy, a tapping on an inductor having a small number of turns (particularly with very high frequencies, for example short waves and ultra short waves) and with a coil having a comparatively large number of turns, for example in the medium-wave and long-wave ranges unwanted effects may be produced, since the second half serves only for compensation and is therefore to be added in addition to the first half required for feed-back, whilst yet the transferred natural capacity thereof remains completely active.

The provision of bridge capacities to obtain the point of symmetry requires, owing to the uncertain influences of the circuit capacities, always a variable capacitor, both the terminals of which are at alternating-voltage potential. Such a variable capacitor always has comparatively large, unwanted stray capacities.

With an additive mixing arrangement comprising an electron tube, in which by inductive feed-back between two coils the oscillations from the oscillator are produced, these disadvantages are obviated, if, in accordance with the invention, one oscillator coil, in series with a separation capacitor, is connected between grid and earth of the electron tube and if the other oscillator coil is arranged between the anode and earth, whilst between the anode and the grid a feed-back capacitor and a coupling capacitor are arranged in series, the feed-back capacitor being chosen with respect to the further circuit elements to be such that at the junction of the said capacitors, to which the input oscillations are fed, substantially no oscillations of oscillator frequency occur.

The invention will now be described more fully by way of example with reference to the drawing.

The anode circuit of a triode 1, serving as a mixer, includes an oscillator coil 2, which is completed by a variable capacitor 3 to form a resonant circuit for the oscillations of the oscillator, and a resonant circuit 4, from which the intermediate-frequency oscillations are obtained. With the coil 2 is coupled a further coil 5 for the feed-back (this coupling is indicated by a curved broken line): this coil is connected to earth at one end and connected at the other end via a separation capacitor 6 to the grid of the mixing triode 1. This grid is connected through a leak resistor 7 to the cathode and earth.

The high-frequency oscillations (signal oscillations) emanating from a preamplifier tube 8 or from the aerial are fed via a coupling capacitor 9 to the grid of the tube 1. In the known circuit arrangement so far described additive mixing would occur, it is true, but the oscillations of the oscillator occurring at the grid of the tube 1 and having a large amplitude, could attain also the preamplifier tube 8 or the input circuit, in general, the high-frequency voltage supply, which may be constituted by the external resistor 10, which may include, if desired, also inductive and capacitative impedances and by the tube 8 with a parallel stray capacitor 11. Not only the interferences which may occur owing to the radiation of the oscillations from the oscillator via the preamplifier tube or the input circuit and the aerial, but difficulties may also occur due to the variation of the frequency and of the tuning of the associated high-frequency input resistor, formed by the impedances 10 and 11, which may act, at least partly, upon the oscillator circuit, since it also obtains oscillations from the oscillator via the separation capacitor 6 and the coupling capacitor 9.

In accordance with the invention the supply point of the high frequency oscillations obtains, via a feed-back capacitor 12, oscillations from the oscillator with opposite phase and suitable amplitude in a manner such that this supply point is substantially free from oscillations from the oscillator. In this manner any radiation and unwanted reaction on the oscillations from the oscillator may be suppressed in a simple manner and to a substantially sufficient extent.

Since the oscillator coil 5 included in the grid circuit is connected to earth at one end, its influence on the high-frequency oscillations is small, whilst in the event of an exchange of the coil 5 and of the capacitor 6, the high frequency voltage occurring across them could be affected adversely by the stray capacity of the coil 5. It is of course, possible not to complete the oscillator coil 2 included in the anode circuit, but to complete the coil 5 included in the grid circuit by parallel connection of a capacitor (3 in the anode circuit) to form a preferably adjustable resonant circuit, this having the advantage that the resonant circuit elements (capacitor and coil) can be connected at one end directly to earth.

The order of succession of the oscillator circuit 2, 3, and of the intermediate-frequency output circuit 4 in the anode circuit may be reversed, since the intermediate-frequency circuit constitutes substantially a short-circuit for the oscillations from the oscillator. The arrangement may be desirable particularly if the part of the oscillator circuit included in the anode circuit is to be tuned, whilst yet the coil 2 and the capacitor 3 must be at earth potential at one end relative to the alternating voltage.

In order to have substantially earth potential for the oscillations from the oscillator at the point of high-frequency supply, the voltage $U_2$ across the oscillator coil 2 included in the anode circuit and the voltage $U_5$ of the oscillator coil 5 included in the grid circuit must have a ratio of $$\frac{U_2}{U_5}=\frac{C_9C_6}{C_{12}(C_9+C_6)}$$

wherein $C_6$, $C_9$ and $C_{12}$ designate the capacities of the separation capacitor 6, the coupling capacitor 9 and the feed-back capacitor 12 respectively. Apart therefrom the condition for the feed-back must be taken into account, from which follows that the capacity of the coupling capacitor 9 and the capacity of the feed-back capacitor 12 are to one another in a ratio at least substantially equal to that between the alternating oscillator voltages at the anode required to maintain the oscillations and those at the grid of the tube 1. This ratio is preferably about 12:1 to 2:1, preferably about 5:1. It must finally be taken into consideration that the capacitors 9 and 6 produce a voltage division for the high-frequency supply. This voltage reduction may be kept low by choosing the capacitor 6 to be small relative to the capacitor 9. In this case, however, for the oscillator voltages between the coil 5 and the junction of the capacitors 9 and 12, which is assumed to be at earth potential, there occurs a material voltage reduction, which can be accepted only as far as no disturbing effect on the oscillations of the oscillator, more particularly no reduction of the tuning range by increase in natural capacity occurs owing to an increase in the transmission ratio between the coil 2 and the coil 5. It has been found to be advantageous to choose the ratio between the capacity of the coupling capacitor 9 and the capacity of the separation capacitor 6 to be about 1.2:1 to 4:1, preferably about 1.8:1.

A circuit arrangement according to the invention is particularly suitable for use of additive mixing, even in the long-wave and the medium-wave ranges, where a satisfactory feed-back of the oscillations from the oscillator can be obtained with suitable proportioning of the circuit elements.

What is claimed is:

1. An additive mixing circuit comprising an electron-discharge device having an input electrode and an output electrode, a two-terminal source of operating voltage, a first coil and a first capacitor connected in series between said input electrode and one of said terminals, a resonant circuit comprising a second coil connected between said output electrode and the other one of said terminals, capacitor means connected for tuning said second coil to a desired oscillation frequency, means providing an inductive feedback coupling between said coils thereby producing an oscillation, a second capacitor and a third capacitor connected in series between said input electrode and said output electrode and having relative values of capacitance whereby substantially no energy from said oscillation occurs at the junction thereof, and a source of input signals connected to said junction.

2. A circuit as claimed in claim 1, in which said one terminal is connected to electrical ground, said first coil being connected to electrical ground.

3. A circuit as claimed in claim 1, including a resonant output circuit connected in series with said second coil.

4. A circuit as claimed in claim 1, in which said second capacitor is connected to said input electrode and said third capacitor is connected to said output electrode, said second capacitor having a larger value of capacitance than that of said third capacitor in a ratio ranging from 2:1 to 12:1.

5. A circuit as claimed in claim 1, in which said second capacitor is connected to said input electrode and said third capacitor is connected to said output electrode, said second capacitor having a larger value of capacitance than that of said first capacitor in a ratio ranging from 1.2:1 to 4:1.

References Cited in the file of this patent

UNITED STATES PATENTS

| | | |
|---|---|---|
| 1,560,854 | Pressley | Nov. 10, 1925 |
| 2,147,554 | Schlesinger | Feb. 14, 1939 |
| 2,432,183 | Van Slooten et al. | Dec. 9, 1947 |